S. A. CHERRY.
SPRING WHEEL.
APPLICATION FILED OCT. 21, 1915.
1,195,656.
Patented Aug. 22, 1916.
2 SHEETS—SHEET 1.
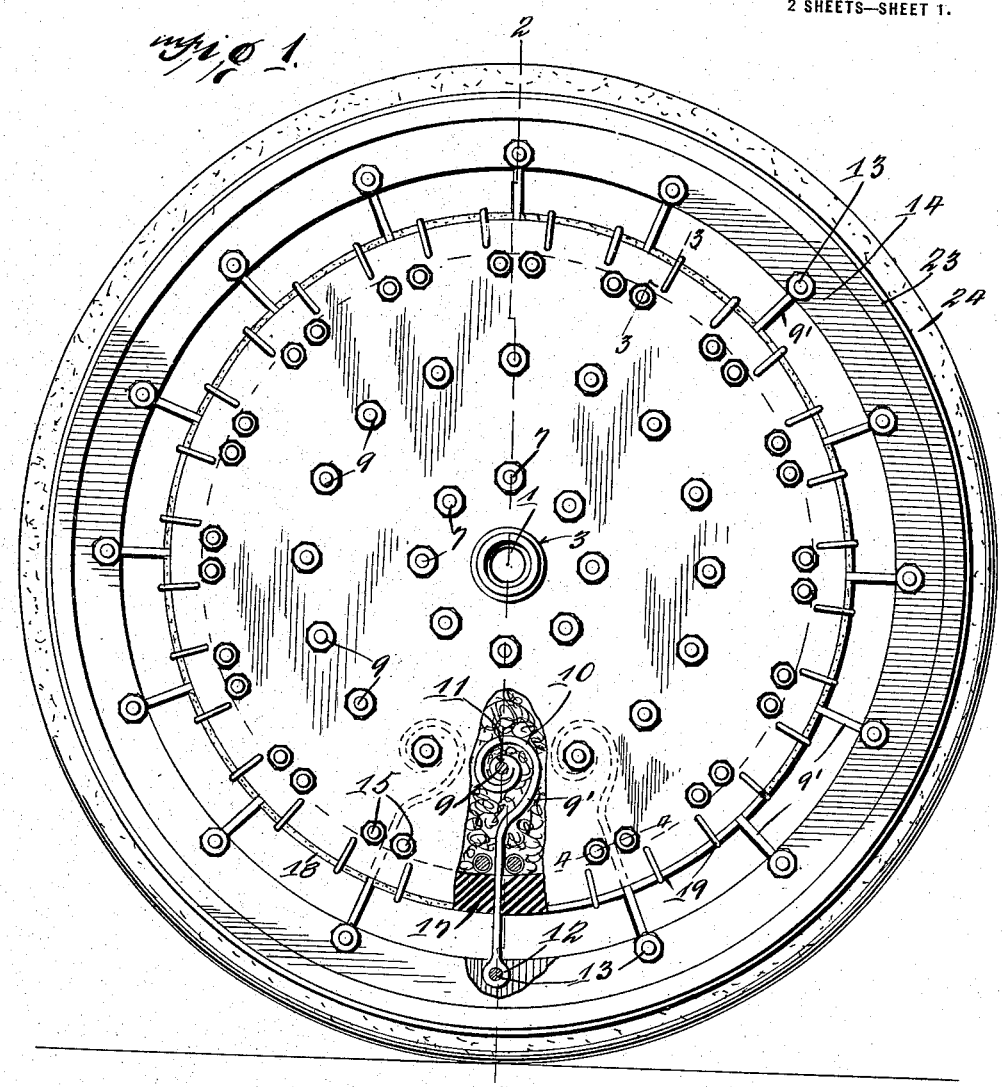
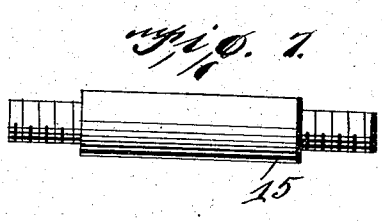
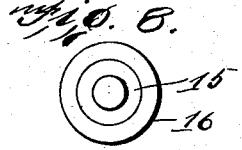
Witnesses
Inventor
S. A. Cherry.
By his Attorneys S. A. CHERRY.
SPRING WHEEL.
APPLICATION FILED OCT. 21, 1915.
1,195,656.
Patented Aug. 22, 1916.
2 SHEETS—SHEET 2.
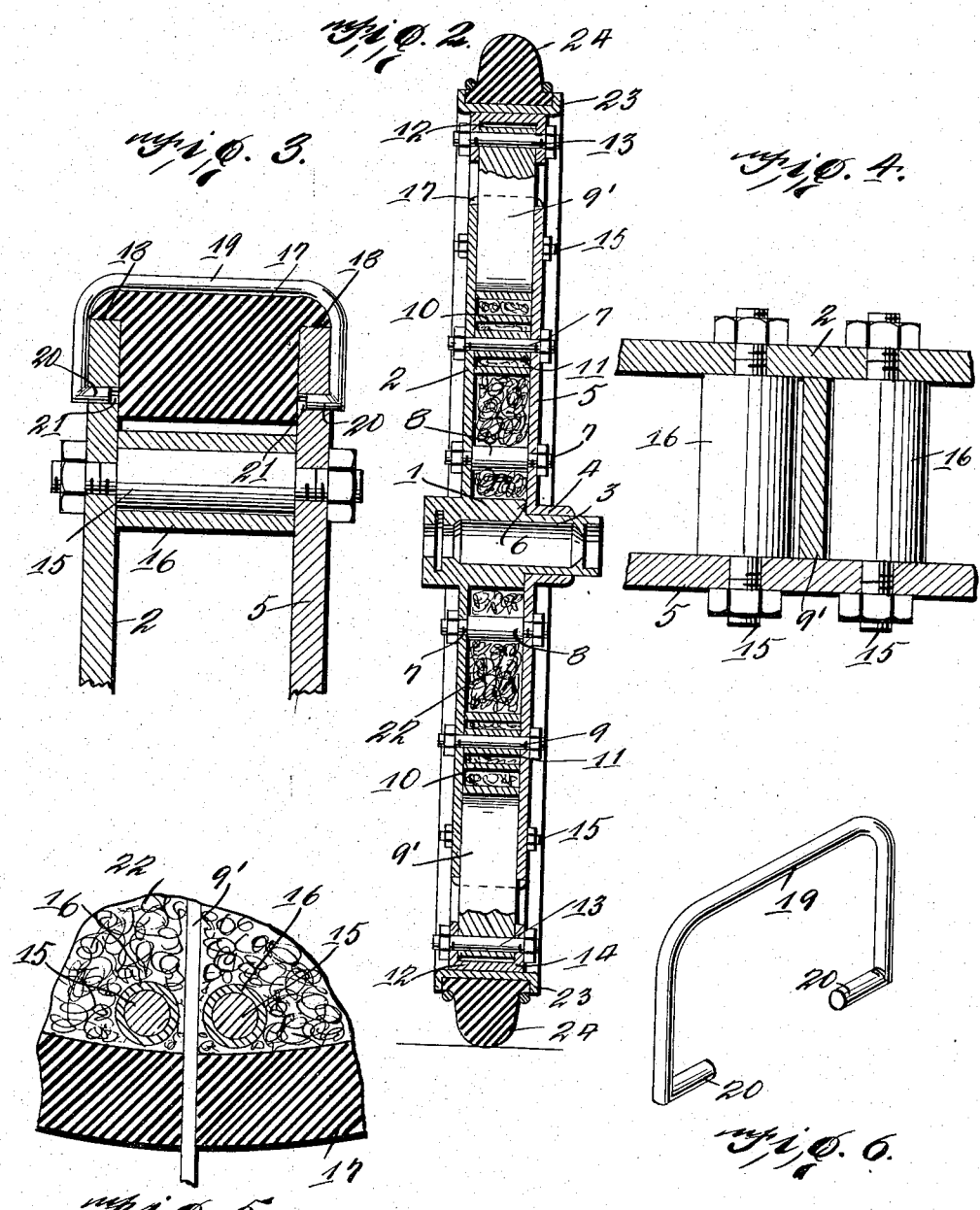

UNITED STATES PATENT OFFICE.

SPENCER A. CHERRY, OF NASHVILLE, TENNESSEE.

SPRING-WHEEL.

1,195,656.  Specification of Letters Patent.  Patented Aug. 22, 1916.

Application filed October 21, 1915. Serial No. 57,179.

*To all whom it may concern:*

Be it known that I, SPENCER A. CHERRY, a citizen of the United States of America, residing at Nashville, in the county of Davidson and State of Tennessee, have invented certain new and useful Improvements in Spring-Wheels, of which the following is a specification, reference being had therein to the accompanying drawing.

This invention relates to spring wheels and has for its object the production of a simple and efficient means for producing a resilient wheel which will constitute a shock absorber or eliminate the necessity of employing a pneumatic tire.

Another object of this invention is the production of a simple and efficient means for sealing the space around the periphery of the inner disk plates for retaining a lubricating packing and also bracing the sides of the spring spokes.

With these and other objects in view, this invention consists of certain novel combinations, constructions, and arrangements of parts as will be hereinafter fully described and claimed.

In the accompanying drawings: Figure 1 is a side elevation, partly in section, of the wheel. Fig. 2 is a vertical section taken on line 2—2 of Fig. 1. Fig. 3 is an enlarged sectional view taken on line 3—3 of Fig. 1. Fig. 4 is a section taken on line 4—4 of Fig 1. Fig. 5 is an enlarged vertical longitudinal section through a portion of the hub section of the wheel, showing the manner in which the resilient plugs engage the respective sides of the spring spokes. Fig. 6 is a detailed perspective of one of the retaining links for the resilient plugs upon the outer portion of the inner hub section. Fig. 7 is a side elevation of one of the spacing bolts used in connection with the present wheel. Fig. 8 is an end view of the structure shown in Fig. 7.

Referring to the accompanying drawings by numerals it will be seen that 1 designates the hub which is provided with an integral plate member 2. The hub 1 is provided with a reduced end 3 over which reduced end 3 fits the collar 4 of the plate 5. The plate 5 is placed in position upon the hub 1 and is adapted to abut against the shoulder portion 6 of the hub 1. A plurality of spacing bolts 7 pass through the plates 2 and 5 adjacent the hub and are arranged on the arc of a circle and these bolts 7 are provided with collar portions 8, which collar portions 8 have their ends abutting against the inner faces of the plates 2 and 5 for the purpose of constituting means for holding the plates in braced spaced relation. A second row of bolts 9 are employed in the wheel construction and are arranged around the first series of bolts 7 on the arc of a circle. This structure is clearly illustrated in Fig. 1 of the drawings.

The spring spokes 9' are provided with coiled ends 10 having eyes 11 through which eyes 11 pass the bolts 9 for constituting a means for securing the spokes 9' in engagement with the hub portion of the wheel which comprises the plates 2 and 5. The outer end of each spoke 9' is provided with an enlarged portion 12, through which enlarged portion 12 extends a bolt 13 carried by the channel felly or rim 14 illustrated in Fig. 2 of the drawings. It will therefore be seen that each spoke 9' is secured between the plates 2 and 5 at one end and has its opposite end secured between the channel plate 14.

A plurality of series of bolts 15 pass through the plates 2 and 5 near the outer peripheries thereof and these bolts 15 carry collars 16 for constituting means for holding the outer ends or peripheries of the plates 2 and 5 in proper spaced relation. It of course should be understood that suitable nuts are threaded upon the respective bolts 7, 9 and 15 for holding the bolts in proper position.

The spring spokes 9' extend between the bolts 15 of each series of bolts as clearly illustrated in Fig. 5, these bolts 15 constituting means for limiting the lateral swing of the spring spokes 9'. It, however, should be understood that the collars 16 carried by the bolts 15 are so positioned as to permit a slight forward and backward movement of the spring spokes 9' as is clearly illustrated in Figs. 1, 4 and 5.

Resilient plugs 17 are fitted in between the outer peripheries of the plates 2 and 5 and constitute sealing means between the outer edges of the plates against the entrance of dust or other foreign material. These plugs 17 are provided with overhanging side edges 18, which side edges 18 overhang the outer edges of the plates 2 and 5. This structure can be clearly seen by carefully considering Fig. 3 of the drawings.

A plurality of retaining links 19 are carried by the plates 2 and 5 and these retaining links 19 are substantially U-shaped and overhang the outer portions of the plugs 17 for retaining the plugs 17 in a proper position between the plates 2 and 5. The links 19 are provided with inwardly extending ends 20 which inwardly extending ends 20 fit in the apertures 21 formed in the plates 2 and 5. The links 19 are preferably formed of spring metal to permit the same to readily clamp over the outer ends of the plugs 17 and also permit the ends 20 to fit in the apertures 21 of the plates 2 and 5.

A packing 22 of fibrous material is placed between the plates 2 and 5 and is held between these plates by means of the plugs 17. This fibrous material 22 is preferably saturated with a lubricant such as oil and the like, to keep the spokes thoroughly lubricated and prevent the same from being attacked by rust or other deteriorating substances.

By carefully considering the drawings it will be understood that the packing may be formed of wool or other suitable fibrous material and that the plugs 17 may be formed of resilient material such as rubber, and the like. It should also be understood that the spokes 9′ are arranged so as to radiate from the central axis of the hub portion 1. From the foregoing description it should also be understood that every spoke of the wheel is adapted to be in tension but that under a severe strain or shock the center of the hub is free to move in any direction toward the rim with all springs taking up the strain and with the tendency to equalize the strain at the center of the wheel when the weight is removed. The rim plate 14 is of course provided with any suitable felly plate 23 which carries preferably a solid resilient tire 24. By carefully considering Fig. 1 it will also be seen that the inner edge of the plate 14 is spaced away from the outer peripheries of the plates 2 and 5.

What I claim is:—

1. A wheel of the class described comprising a hub section, a rim section, spokes interposed between said rim section and hub section, a lubricating means positioned within said hub section and between said spokes for thoroughly lubricating said spokes and said hub section, resilient plugs sealing the outer edges of said hub section and interposed between said spokes and adapted to permit said spokes to move under pressure and compress said plugs, and means secured to said hub section and overhanging said plugs for retaining said plugs against accidental detachment from said hub section.

2. A wheel of the class described comprising a hub section, a rim section, spring spokes interposed between said rim section and hub section, a lubricating means positioned in said hub section and adapted to lubricate the space between the edges of said spokes and the inner face of said hub section, resilient plugs sealing the outer edges of said hub section and interposed between said spring spokes, spring links secured to said hub section and overhanging said plugs for detachably holding said plugs in engagement with said hub section, said spring links provided with inwardly projecting ends, and said hub section provided with apertures for receiving said inwardly extending ends.

3. A wheel of the class described comprising a hub section, a rim section, spring spokes interposed between said rim section and hub section, a lubricating means positioned in said hub section and adapted to lubricate the space between the edges of said spokes and the inner face of said hub section, resilient plugs sealing the outer edges of said hub section and interposed between said spring spokes, spring links secured to said hub section and overhanging said plugs for detachably holding said plugs in engagement with said hub section, said spring links provided with inwardly projecting ends, said hub section provided with apertures for receiving said inwardly extending ends, said hub section comprising a plurality of spaced plates, and means for rigidly holding said spaced plates in proper spaced relation for permitting the free operation of said spring spokes.

4. A wheel of the class described comprising a hub section, a rim section, spring spokes interposed between said rim section and hub section, a lubricating means positioned in said hub section and adapted to lubricate the space between the edges of said spokes and the inner face of said hub section, resilient plugs sealing the outer edges of said hub section and interposed between said spring spokes, spring links secured to said hub section and overhanging said plugs for detachably holding said plugs in engagement with said hub section, said spring links provided with inwardly projecting ends, said hub section provided with apertures for receiving said inwardly extending ends, said hub section comprising a plurality of spaced plates, means for rigidly holding said spaced plates in proper spaced relation for permitting the free operation of said spring spokes, and means for limiting the swinging movement of said spring spokes.

In testimony whereof I hereunto affix my signature.

SPENCER A. CHERRY.